US011870823B2

(12) United States Patent
Um et al.

(10) Patent No.: US 11,870,823 B2
(45) Date of Patent: Jan. 9, 2024

(54) CALL SHARING SYSTEM AND CALL SHARING METHOD FOR CONSTRUCTION WORK

(71) Applicant: HYUNDAI DOOSAN INFRACORE CO., LTD., Incheon (KR)

(72) Inventors: Heongsik Um, Incheon (KR); Junhyun Jang, Incheon (KR); Gijung Yun, Incheon (KR)

(73) Assignee: HYUNDAI DOOSAN INFRACORE CO., LTD., Incheon (KR)

( * ) Notice: Subject to any disclaimer, the term of this patent is extended or adjusted under 35 U.S.C. 154(b) by 0 days.

(21) Appl. No.: 17/715,405

(22) Filed: Apr. 7, 2022

(65) Prior Publication Data
US 2022/0329639 A1  Oct. 13, 2022

(30) Foreign Application Priority Data

Apr. 7, 2021 (KR) .................. 10-2021-0045193

(51) Int. Cl.
| | |
|---|---|
| G06F 15/16 | (2006.01) |
| H04L 65/401 | (2022.01) |
| H04L 65/403 | (2022.01) |
| H04L 65/1093 | (2022.01) |
| H04L 65/1089 | (2022.01) |
| G06Q 10/0631 | (2023.01) |

(52) U.S. Cl.
CPC .... *H04L 65/4015* (2013.01); *G06Q 10/06311* (2013.01); *H04L 65/1089* (2013.01); *H04L 65/1093* (2013.01); *H04L 65/403* (2013.01)

(58) Field of Classification Search
CPC ............. H04L 65/4015; H04L 65/1089; H04L 65/1093; H04L 65/403; G06Q 10/06311; G06Q 50/08; G06Q 10/06312
USPC ........................................................ 709/231
See application file for complete search history.

(56) References Cited

U.S. PATENT DOCUMENTS 7,761,318 B2 * 7/2010 Olson ............ G06Q 10/063114
705/40
8,612,276 B1 * 12/2013 Nielsen .......... G06Q 10/063118
705/7.22

(Continued)

FOREIGN PATENT DOCUMENTS

EP 2979062 B1 * 5/2018 ........... G01C 15/004
KR 102026531 B1 * 10/2017

(Continued)

*Primary Examiner* — Moustafa M Meky
*Assistant Examiner* — Thorne E Waugh
(74) *Attorney, Agent, or Firm* — K&L Gates LLP

(57) ABSTRACT

A call sharing system for a construction work includes an administrator terminal configured to display a working drawing of a construction site on an administrator screen and to transmit a work request signal including a work area designated on the working drawing, a plurality of worker terminals configured to display the working drawing on each worker screen, each worker terminal being configured to receive the work request signal and to transmit a response signal in response to the work request signal, and a server configured to transmit and receive data between the administrator terminal and the worker terminals and to select the worker terminals for receiving the work request signal according to a work detail.

13 Claims, 9 Drawing Sheets

(56) References Cited

U.S. PATENT DOCUMENTS

| | | | | |
|---|---|---|---|---|
| 8,732,125 B2 * | 5/2014 | Omansky | ............... | G06Q 50/08 |
| | | | | 707/621 |
| 2017/0131961 A1 * | 5/2017 | Sugaya | ................... | G10L 15/26 |
| 2018/0096275 A1 * | 4/2018 | Akutsu | ................... | H04W 4/02 |
| 2018/0114367 A1 * | 4/2018 | Kuwabara | .......... | H04N 1/32352 |
| 2018/0137446 A1 * | 5/2018 | Shike | ...................... | E02F 9/261 |
| 2020/0366722 A1 * | 11/2020 | Behrbaum | .............. | G06F 9/451 |
| 2020/0399863 A1 * | 12/2020 | Aizawa | ................. | G06Q 50/08 |
| 2021/0294986 A1 * | 9/2021 | Sugaya | ................... | G06F 40/42 |

FOREIGN PATENT DOCUMENTS

| | | | |
|---|---|---|---|
| KR | 102026531 B1 * | 9/2019 | |
| WO | WO-2004095332 A1 * | 11/2004 | ..... G06Q 10/063112 |

* cited by examiner

CALL SHARING SYSTEM AND CALL SHARING METHOD FOR CONSTRUCTION WORK

CROSS-REFERENCE TO RELATED APPLICATIONS

This application claims priority under 35 U.S.C. § 119 to Korean Patent Application No. 10-2021-0045193, filed on Apr. 7, 2021 in the Korean Intellectual Property Office (KIPO), the contents of which are herein incorporated by reference in their entirety.

BACKGROUND

Example embodiments relate to a call sharing system and call sharing method for a construction work. More particularly, example embodiments relate to a call sharing system for sharing call information among managers and workers for a construction work, and a method of call sharing using the same.

Recently, a construction site monitoring system based on 3D surveying or drone surveying has been released for managers and workers. However, there are still limitations in communication between the manager and each worker. For example, when an excavator driver is loading into a dump truck, it may be necessary to call a next truck to the location where the excavator is located, and, when starting an inspection survey after a construction work on a specific area, a surveyor should be called and a location of the survey and the area to be surveyed should be indicated and explained. In this case, because it is necessary for the worker or manager to make a direct call through a telephone or walkie-talkie and to share the work request and status verbally and visually, there is a problem in that accuracy is lowered and unnecessary procedures are carried out.

SUMMARY

Example embodiments provide a call sharing system for a construction work capable of sharing call information among a manager and workers at a construction site.

Example embodiments provide a call sharing method for a construction work capable of sharing call information among a manager and workers at a construction site using the call sharing system.

According to example embodiments, a call sharing system for a construction work includes an administrator terminal configured to display a working drawing of a construction site on an administrator screen and to transmit a work request signal including a work area designated on the working drawing, a plurality of worker terminals configured to display the working drawing on each worker screen, each worker terminal being configured to receive the work request signal and to transmit a response signal in response to the work request signal, and a server configured to transmit and receive data between the administrator terminal and the worker terminals and to select the worker terminals for receiving the work request signal according to a work detail.

In example embodiments, the worker terminal transmits a first worker terminal of the plurality of worker terminal transmits a follow-up work request signal including a work request for follow-up work to be performed subsequently after a current work, and a second worker terminal of the plurality of worker terminals receives the follow-up work request signal and transmits the response signal in response to the follow-up work request signal.

In example embodiments, the administrator terminal stops transmitting the work request signal when the administrator terminal receives the response signal from a preset number of the worker terminals.

In example embodiments, the server further includes a list of workers that classifies registered workers according to worker information, and the administrator terminal selectively transmits the work request signal according to the worker information.

In example embodiments, the administrator terminal selectively transmits the work request signal according to construction machinery owned by the workers.

In example embodiments, the server further include a field map, and the administrator terminal overlays the working drawing and the field map, and displays the overlaid working drawing and field map on the administrator screen.

In example embodiments, the administrator terminal displays worker information, a current location and a distance from the designated work area of the worker terminal on the administrator screen.

In example embodiments, the worker terminal displays worker information, a current location and a distance from the designated work area of the other worker terminal on the worker screen.

According to example embodiments, in a method of call sharing for a construction work, transmitting a work request signal including a work area designated on a working drawing of a construction site to a server through an administrator terminal. Transmitting the work request signal received through the server to a plurality of worker terminals selected according to a work detail. Transmitting a response signal in response to the work request signal to the administrator terminal through the worker terminal that received the work request signal.

In example embodiments, the method further includes transmitting a follow-up work request signal including a work request for follow-up work to be performed subsequently after a current work to a second worker terminal of the plurality of worker terminals through a first worker terminal of the plurality of worker terminals that received the work request signal, and transmitting the response signal in response to the follow-up work request signal to the administrator terminal and the first worker terminal through the second worker terminal.

In example embodiments, the administrator terminal stops transmitting the work request signal when the administrator terminal receives the response signal from a preset number of the worker terminals.

In example embodiments, the method further includes registering a group of workers including information about the workers on the construction site.

In example embodiments, transmitting the work request signal to the plurality of worker terminals includes selectively transmitting the work request signal according to construction machinery owned by the registered group of workers.

In example embodiments, the method further includes displaying worker information, a current location and a distance from the designated work area of the worker terminals on an administrator screen of the administrator terminal.

In example embodiments, the method further includes displaying worker information, a current location and a distance from the designated work area of the other worker terminal on a worker screen of the worker terminal.

According to example embodiments, a call sharing system for a construction work includes may include an administrator terminal configured to display a working drawing of a construction site on an administrator screen, transmit a work request signal including a work area designated on the working drawing, a plurality of worker terminals configured to display the working drawing on each worker screen, each worker terminal being configured to receive the work request signal and to transmit a response signal in response to the work request signal, and a server configured to transmit and receive data between the administrator terminal and the worker terminals and to select the worker terminals for receiving the work request signal according to a work detail.

Accordingly, administrator and workers in the construction site may share a location of workers based on their terminals, and it may be possible to manage the construction work in real time through the system that may share the work area specified on the working drawings for the construction site. Furthermore, it is possible to increase productivity for the construction work through a map area-based call system between the workers.

However, the effect of the inventive concept may not be limited thereto, and may be expanded without being deviated from the concept and the scope of the present disclosure.

BRIEF DESCRIPTION OF THE DRAWINGS

Example embodiments will be more clearly understood from the following detailed description taken in conjunction with the accompanying drawings.

DETAILED DESCRIPTION

Figure 1:
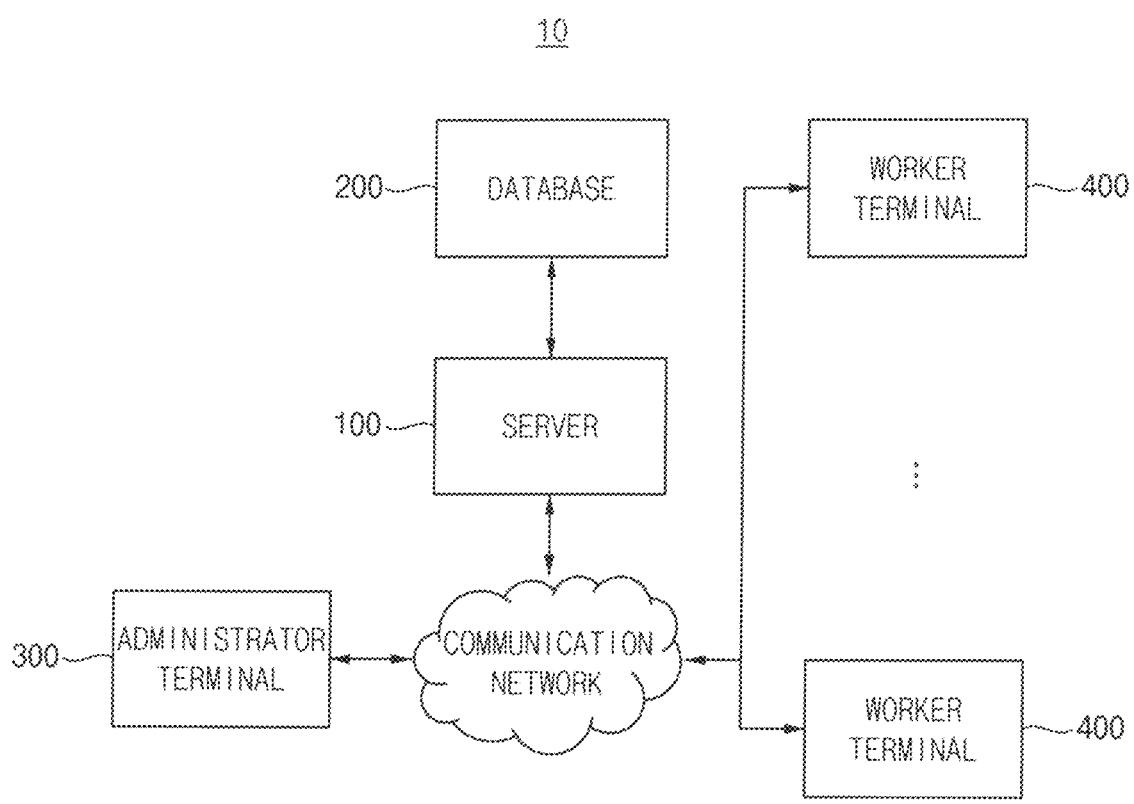
FIG. 1 is a block diagram illustrating a call sharing system for a construction work in accordance with example embodiments.

Hereinafter, preferable embodiments of the present disclosure will be explained in detail with reference to the accompanying drawings.

In the drawings, the sizes and relative sizes of components or elements may be exaggerated for clarity.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art.

FIG. 1 is a block diagram illustrating a call sharing system for a construction work in accordance with example embodiments.

Referring to FIG. 1, in example embodiments, a call sharing system 10 for a construction work may include a server 100, a database 200, an administrator terminal 300 and a worker terminal 400. The server 100, the administrator terminal 300 and the worker terminal 400 may communicate with each other through a communication network. In this case, an application for communicating with the server 100 may be installed in the administrator terminal 300 and the worker terminal 400, and the administrator terminal 300 and the worker terminal 400 may communicate with the server 100 by driving the application.

The server 100 may serve to connect the administrator terminal 300, the worker terminal 400 and the database 200 to transmit and receive data between each other. The server 100 may connect an administrator application displayed on the administrator terminal 300 and a worker application displayed on the worker terminal 400 through a communication network, and may provide a system for sharing information.

An administrator and a worker may exchange the data with the server 100 by logging in to the administrator application and the worker application, respectively. The server 100 may manage identification information for recognizing the administrator and the worker for the login.

The server 100 may transmit idle identification information indicating a workable state of the worker to the administrator terminal 300, such that the administrator can determine whether or not the worker is currently able to work. For example, the administrator terminal 300 may display the idle identification information on the administrator application in green when the corresponding worker is able to work, and in red when the worker is not able to work.

The communication network connecting the server 100, the administrator terminal 300 and the worker terminal 400 may include a network established by a mobile communication service provider. Alternatively, the communication network may include a device such as an Access Point (AP).

For example, the AP may be a short-distance communication device, and may serve as a router performing a wireless communication function between the APs. The AP may be a short-range wireless communication technology supporting device having a function of a gateway supporting connection as a wired network. As an example, the communication network equipment may be installed at regular intervals in each area of the construction site to enable wireless short-distance communication within a predetermined zone.

The server 100 may manage a location of the worker by mapping a location signal generated from the worker terminal 400. The location signal may be tracked using a Global Positioning System (GPS) installed in the worker terminal 400. The server 100 may calculate a distance of the worker from a work area where the work is performed by using the location signal.

The server 100 may transmit the location of a specific worker that is determined by tracking the location signal of Global Positioning System (GPS) installed in the worker terminal 400, to the administrator and other workers. The location of the specific worker may be displayed on a screen of the administrator terminal 300 and a screen of the worker terminal 400. The location of the specific worker may be shared with an administrator and other workers to thereby improve work efficiency.

The server 100 may receive worker information that is collected from the workers at the construction site and inputted through an input device by the administrator. The worker information may include a list of workers classified by groups. The worker information may include worker identification information, worker authority information, construction machinery information, vehicle number, affiliated company information, current location information, the idle identification information, and the like. The worker information may be inputted to the server 100, and be stored and managed in the database 200.

The server 100 may receive a working drawing, a drone scan map, and the like that is inputted through the input device by the administrator. The working drawing and the drone scan map may be inputted into the server 100 through the input device. The working drawing and the drone scan map may be transmitted to the database 200 and be stored in the database 200.

The server 100 may receive the work area that is designated by the administrator on the working drawing from the administrator terminal 300. The server 100 may transmit the work area to the worker terminal 400.

The server 100 may manage call information transmitted from the administrator terminal 300 to the worker terminal 400. In addition, the server 100 may manage call information answered to a call and call information not answered yet from the worker terminal 400. The call information that the administrator requests the worker may be defined as a work request. The call information transmitted by the administrator terminal 300 to the worker terminal 400 may include the work request. The work request may include the work area and a work detail designated by the administrator on the work drawing. The administrator terminal 300 may transmit a work request signal including the work request.

The server 100 may manage the call information transmitted from the worker terminal 400 to the other worker terminal 400. In addition, the server 100 may manage the call information answered to a call and the call information not answered yet from the other worker terminal 400. The call information that the worker requests the other worker for follow-up work may be defined as a follow-up work request. The follow-up work request may include a request for follow-up work to be performed subsequently after a current work. The call information transmitted from the worker terminal 400 to the other worker terminal 400 may include the request for the follow-up work. The follow-up work request may include the work area and the work detail designated by the administrator on the working drawing. The worker terminal 400 may transmit a follow-up work request signal including the follow-up work request.

The server 100 may manage a work progress and additional requests transmitted from the worker terminal 400 to the administrator terminal 300. In addition, the server 100 may manage the additional requests accepted by the administrator terminal 300 and the additional requests in progress.

The server 100 may receive an input of a work progress status or additional requests for a specific area. The server 100 may transmit the work progress status or the additional requests input by the worker received from the worker terminal 400 to the administrator terminal 300. For example, the work progress status may include information on a degree of completion of a work currently in progress, materials required to proceed with the work, a worker in progress, and construction machinery in use.

The server 100 may receive the call information between the administrator terminal 300 and the worker terminal 400, and send a notification to at least one of the administrator terminal 300 and the worker terminal 400, i.e., a target of the call information. In addition, the server 100 may receive the call information between the worker terminal 400 and the other worker terminal 400 and send a notification to a target of the call information.

When the server 100 receives a call request including the work area and the work detail from the administrator terminal 300, the server 100 may select at least one worker terminal 400 suitable for the call request as a candidate. The server 100 may select the worker terminal 400 of the candidate suitable for the work in consideration of the worker information stored in the database 200. The worker information may include worker identification information, worker authority information, construction machinery information, vehicle number, affiliated company information, worker identification information, current location information, the idle identification information, and the like. The server 100 may transmit the call information to the at least one worker terminal 400 selected as the candidate. When the call request is accepted by any worker terminal 400, the server 100 may assign the worker corresponding to the accepted worker terminal 400 to the work site. The server 100 may transmit assigned work information (work location, work content, work range, etc.) to the accepted worker terminal 400.

The server 100 may transmit the call information from the administrator terminal 300 to a specific worker selected by the administrator. When the call request is accepted by a worker terminal 400 of a specific worker, the server 100 may assign the worker corresponding to the accepted worker terminal 400 to the work site. The server 100 may transmit the assigned work information (work location, work content, work range, etc.) to the worker terminal 400.

In order to determine the work area, the server 100 may divide the work site into a grid of a predetermined area (eg, in units of 1 meter) and calculate the location based on the grid. For this calculation, information stored in the database 200 (a drawing of a work site, a map, etc.) may be used.

The database 200 may share stored data with the server 100. The database 200 may be provided separately or integrally with the server 100.

Data on the construction site may be stored in the database 200. The data on the construction site may include construction content, the work drawing, work maps, manager access right list, worker access right list, construction equipment information, construction material information, and the like.

The database 200 may store administrator data and worker data. The administrator data may include administrator identification information, administrator authority information, current location information, call request identification information, and the like. The worker data may include worker identification information, worker authority information, construction machinery information, vehicle number, affiliated company information, worker identification information, current location information, the idle identification information, and the like.

The database 200 may classify and store each item of equipment type, construction type, construction equipment information, and equipment environment information. The database 200 may update each item under an administrator's access.

The database 200 may store a list of the workers in association with the construction equipment information owned by the worker. For example, the worker information may be stored in association with information about the equipment itself. The information about the equipment itself may include types, characteristics, functions, specifications, etc.

The database 200 may set and store a type of equipment as a category to systematically classify construction equipment selected based on various criteria such as function, operation form, and movement method. For example, the type of equipment to be stored in the database 200 may be civil foundation equipment, production equipment, packaging equipment, transport and unload equipment, support equipment, and special construction machinery. In more detail, the civil foundation equipment may be subdivided into earthmoving equipment, foundation equipment, and stationary equipment. Production equipment may be subdivided into aggregate equipment and plant equipment. Paver equipment may be subdivided into concrete equipment and asphalt equipment. Transport and unloading equipment may be subdivided into transport equipment and unloading equipment.

Figure 2:
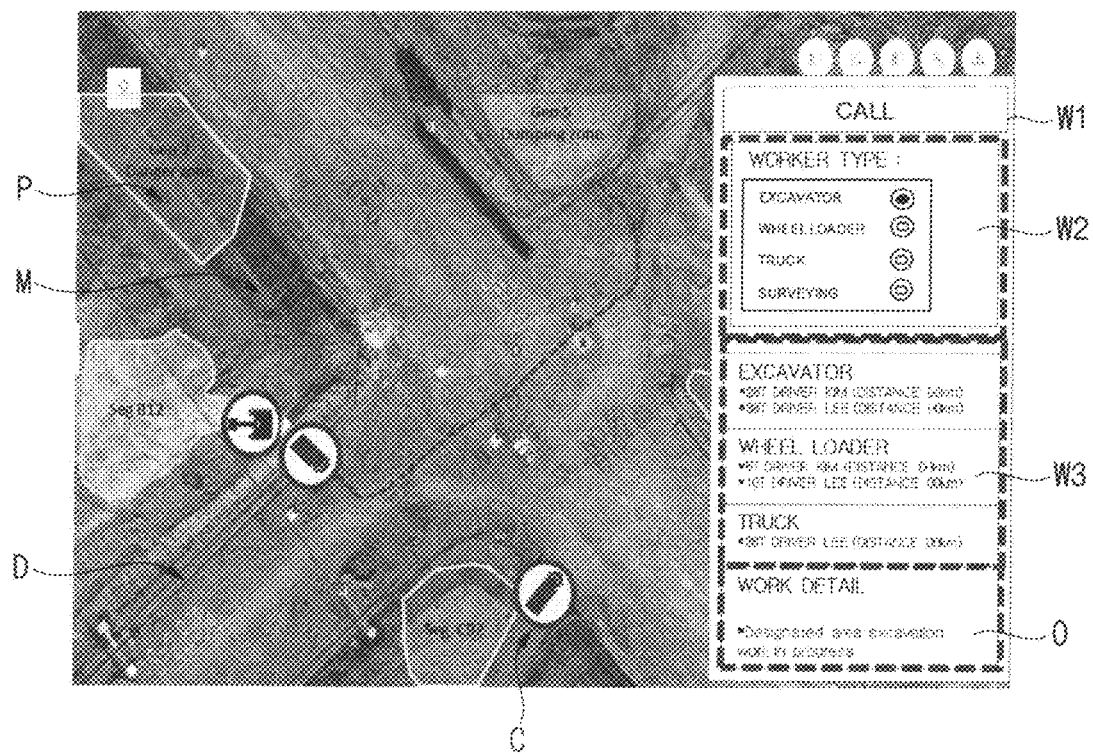
FIG. 2 is a view illustrating an administrator screen displayed on an administrator terminal of FIG. 1.
Figure 3:
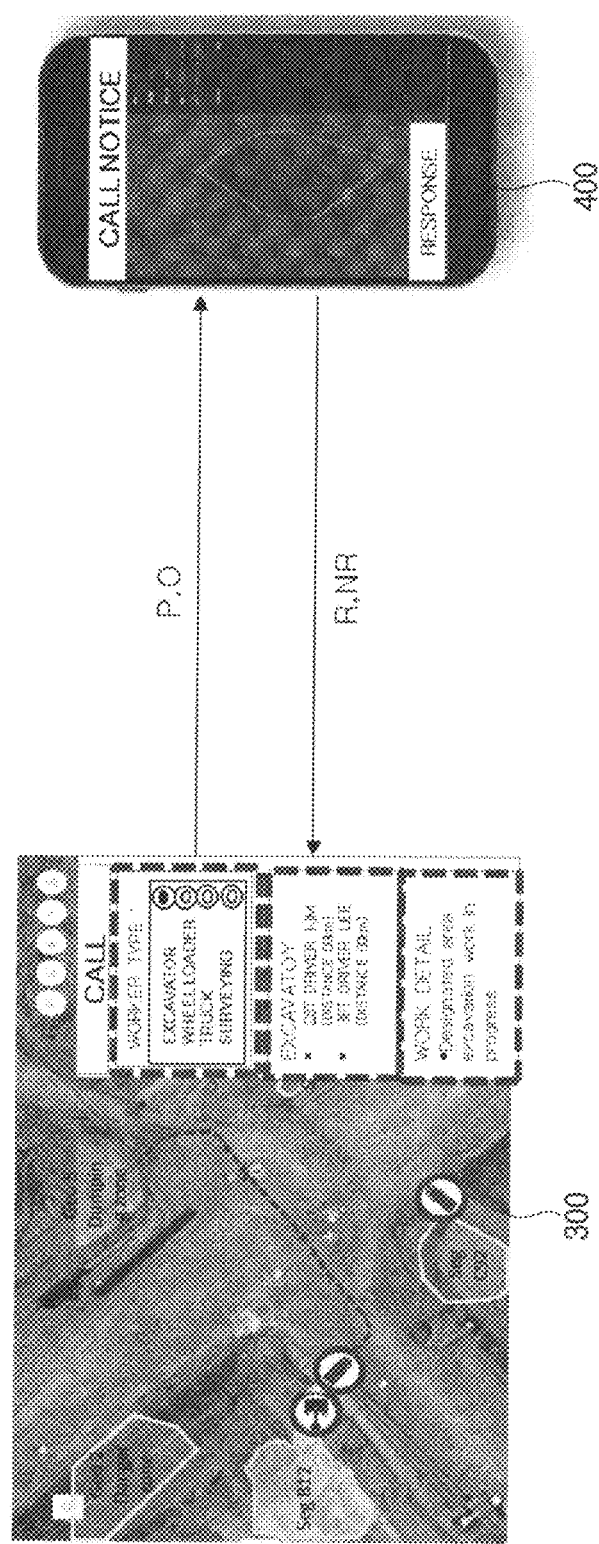
FIG. 3 is a view illustrating transmission and response of a work request signal for specific worker terminal.
Figure 4:
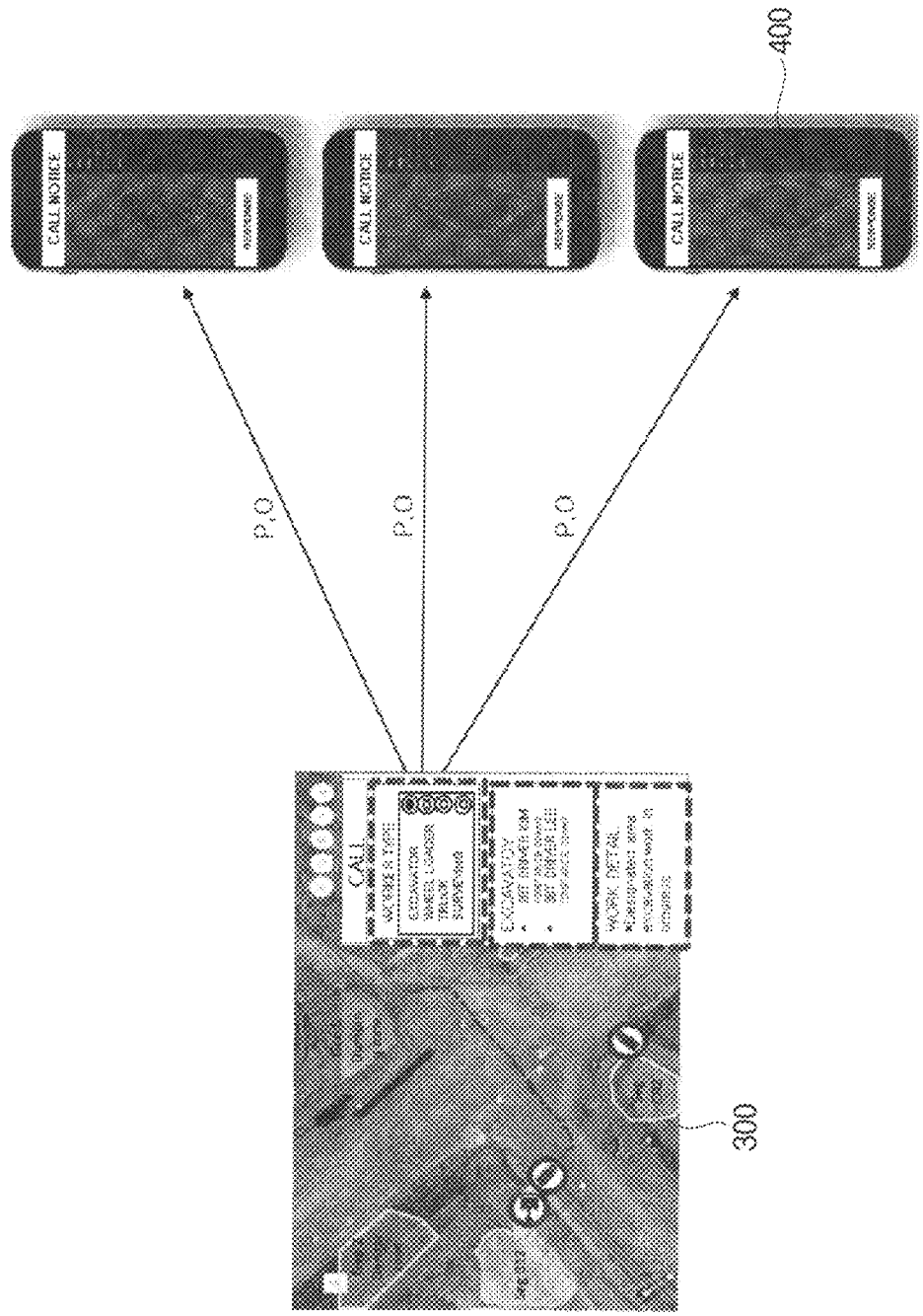
FIGS. 4 and 5 are views illustrating transmission and response of a work request signal for a plurality of worker terminals.
Figure 5:
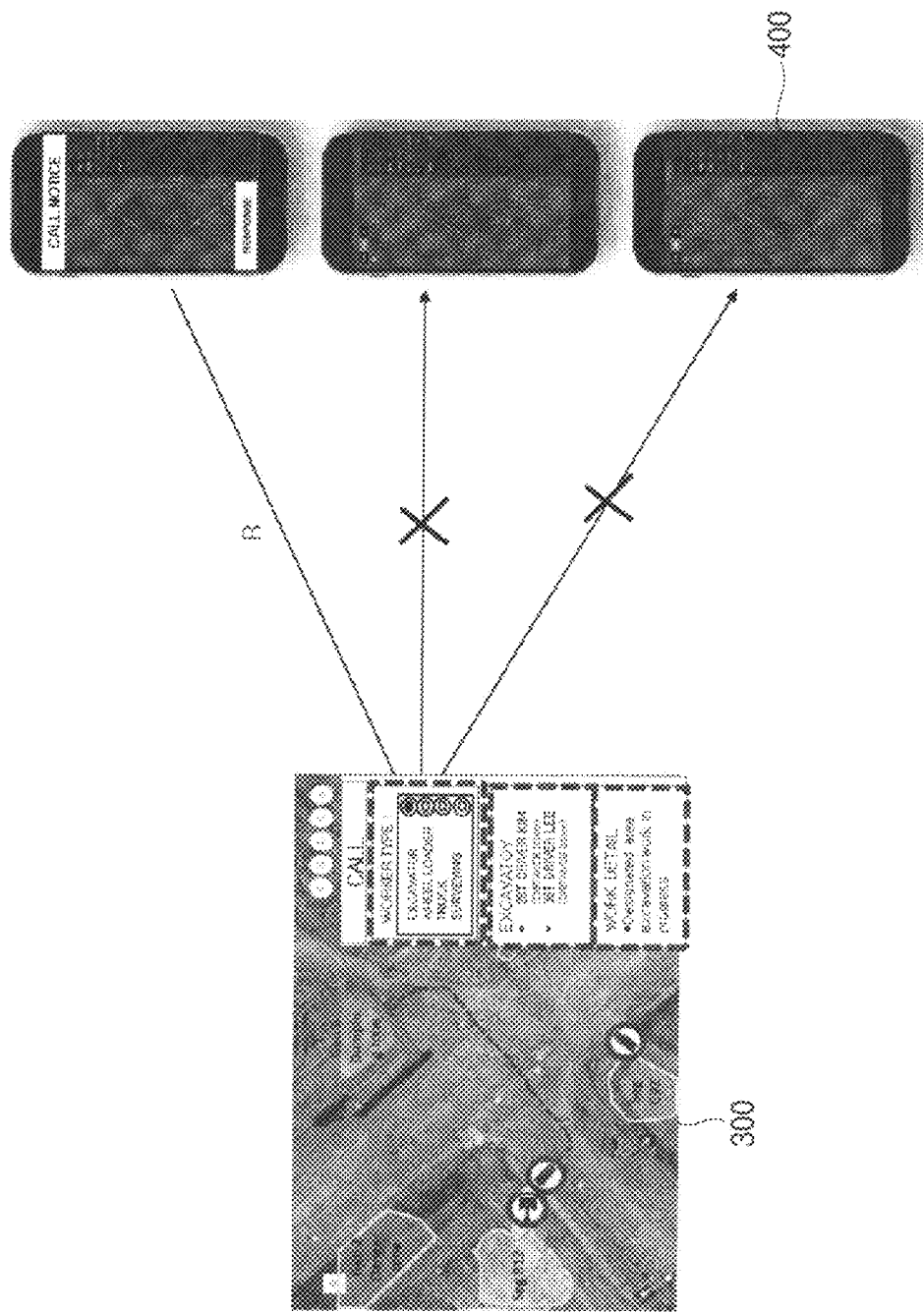

FIG. 2 is a view illustrating an administrator screen displayed on an administrator terminal of FIG. 1. FIG. 3 is a view illustrating transmission and response of a work request signal for specific worker terminal. FIGS. 4 and 5 are views illustrating transmission and response of a work request signal for a plurality of worker terminals.

Referring to FIGS. 2 to 5, the administrator terminal 300 may provide an administrator application that allows the administrator to input a command and call the worker to a specific work area.

The administrator terminal 300 may include a communication terminal capable of wireless communication with the server 100. The communication terminal may include a mobile phone, a smart phone, a smart pad, a notebook computer, a navigation device, a wearable device, and the like. The wearable device may include a watch-type terminal, a glass-type terminal, a head mounted display (HMD), and the like.

The administrator may log in to the administrator application through the administrator terminal 300. In this case, administrator log-in information may be provided to the server 100, and the server 100 may retrieve administrator storage information according to the administrator log-in information provided by the administrator from the database 200. The administrator storage information may include administrator identification information, administrator authority information, current location information, call request identification information, and the like.

In example embodiments, the administrator terminal 300 may display the working drawing D and a field map M on an administrator screen. For example, the field map M may be a map photographed in the air through a drone.

The administrator may set the work area P on the working drawing D and the field map M by the administrator terminal 300. For example, the work area P may be set by freely designating an area on a screen on which the work drawing D and the field map M are overlaid.

The administrator terminal 300 may input work information O for the designated work area P. The administrator terminal 300 may store the inputted work information (required worker type, worker information, and job progress degree) in the database 200 through the server 100. The work information may include planting work information, transport work information, excavation work information, civil work information, and the like.

The administrator terminal 300 may monitor workers and construction equipment on the field map M or the working drawing D. The administrator terminal 300 may check a movement of the worker or the construction equipment in real time. The worker and the construction equipment may be converted into an icon C and displayed on the administrator screen.

The administrator terminal 300 may call the worker or the construction equipment to the work area P set by the manager, a specific area, or the location of the administrator.

The administrator terminal 300 may load a worker call window W1 on one side of the administrator screen in order to call the worker. The worker call window W1 that pops up in the administrator screen may include a worker type selection window W2 for selecting a call type. The worker call window W1 may display the list of workers according to a type selected in the worker type selection window W2. A worker list window W3 may display the list of workers including a called worker type, worker information, and a distance of the worker from a calling point.

For example, when the administrator terminal 300 displays the worker type selection window W2 in the worker call window W1, the administrator terminal 300 may classify and display the construction equipment owned by the worker according to the construction equipment type provided in the database 200. The classified construction equipment types may include civil engineering foundation equipment, production equipment, packaging equipment, transportation and unloading equipment, support equipment, and special construction machinery. The administrator terminal 300 may classify and display the construction equipment by use (civil foundation, production equipment, packaging equipment, transport and unloading, support, special construction), such that the administrator can make a search for the construction equipment more intuitively.

The administrator terminal 300 may display a detailed classified list, when the construction equipment is selected from a list of the construction equipment classified by use. For example, the civil foundation equipment may be subdivided into earthmoving equipment, foundation equipment, and stationary equipment. The production equipment may be subdivided into aggregate equipment and plant equipment. The paver equipment may be subdivided into concrete equipment and asphalt equipment. The transport and unloading equipment may be subdivided into transport equipment and unloading equipment.

The administrator terminal 300 may display detailed information in the worker list W3 when the manager requests the detailed information about the worker. For example, the worker list W3 may display the weight, radius, quantity, year, or loading amount of construction equipment owned by the worker. In addition, the worker list W3 may display the worker's history, age, qualification, and the like as a list.

As illustrated in FIG. 3, the administrator terminal 300 may transmit the work request signal to the specific worker selected by the administrator in the worker type selection window W2 and the worker list W3. The work request signal may include the designated work area P and the work information O. The selected specific worker may select one of response R and rejection NR through the worker terminal 400.

As illustrated in FIGS. 4 and 5, when the administrator does not select the specific worker, the work request signal may be transmitted to the target worker terminals 400 of a plurality of the workers. The work request signal may include the designated work area P and the work information O. For example, the work request signal may be transmitted to a classified group selected in the worker type selection window W2. The selected classified group may include civil foundation equipment holding worker group, production equipment holding worker group, packaging equipment holding worker group, transport and unloading equipment holding worker group, support equipment holding worker group, and special construction machine holding worker group. Alternatively, the work request signal may be transmitted to all worker terminals 400 at the construction site.

When the administrator does not specify a worker, a plurality of random workers corresponding to the number of workers set by the manager may respond R to the transmitted work request signal. When the preset number of workers is satisfied, the transmission of the work request signal to the non-responsive worker terminal 400 may be stopped.

Figure 6:
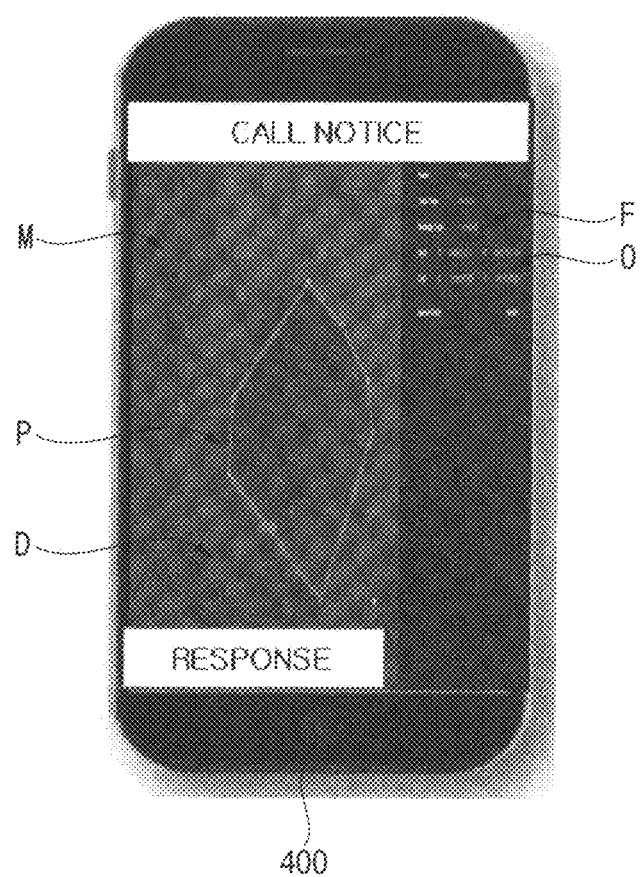
FIGS. 6 and 7 are views illustrating a worker screen displayed on a worker terminal of FIG. 1.
Figure 7:
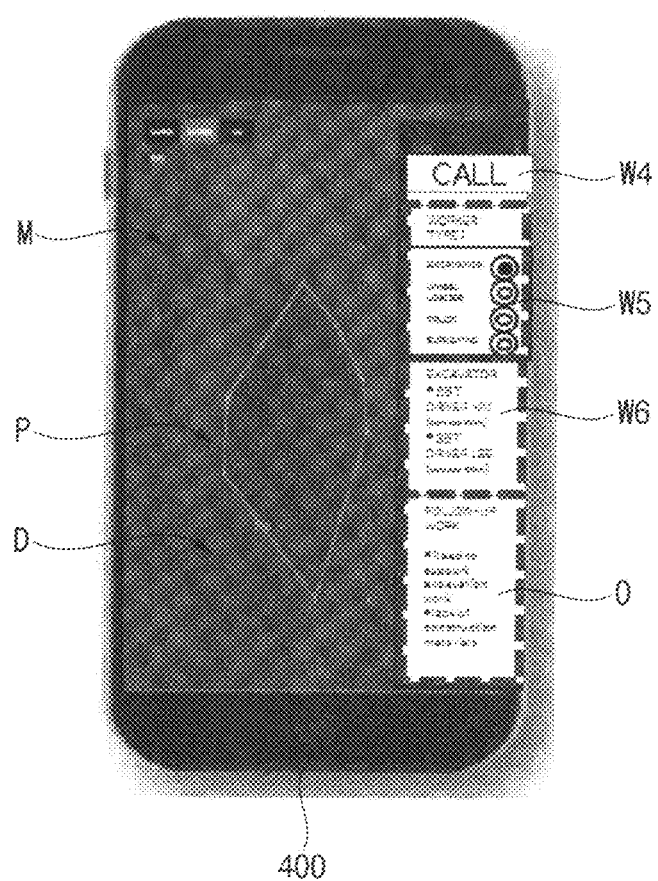

FIGS. 6 and 7 are views illustrating a worker screen displayed on a worker terminal of FIG. 1.

Referring to FIGS. 6 and 7, the worker terminal 400 may provide the worker application for the worker that allows the worker to receive a command from the administrator, check the work detail and respond to a call received from the administrator.

The worker terminal 400 may include a communication terminal capable of wireless communication with the server 100. The communication terminal may include a mobile phone, a smart phone, a smart pad, a notebook computer, a navigation device, a wearable device, and the like. The wearable device may include a watch-type terminal, a glass-type terminal, a head mounted display (HMD), and the like.

The worker may log in to the worker application through the worker terminal 400. In this case, worker log-in information may be provided to the server 100, and the server 100 may retrieve worker storage information according to the worker log-in information provided by the worker from the database 200. The worker storage information may include worker identification information, worker authority information, construction machinery information, vehicle number, affiliated company information, current location information, the idle identification information, and the like.

The worker terminal 400 may generate monitoring information by combining the worker identification information and the current location information at predetermined intervals, and may provide the monitoring information to the server 100. In this case, the idle identification information may indicate whether or not the worker is currently able to work, and may be directly inputted from the worker terminal 400 of the worker or provided when the worker logs in to the worker application. The server 100 may update the idle identification information and the current location information according to the monitoring information.

In example embodiments, the worker terminal 400 may include a Global Positioning System (GPS). The worker terminal 400 may transmit the current location information to the administrator terminal 300 or another worker terminal 400 through GPS.

The worker terminal 400 may display the working drawing D and the field map M, etc. on the worker screen. For example, the field map M may be a map photographed in the air through a drone.

The worker terminal 400 may receive the calls from the administrator or other workers. When the worker terminal 400 receives the call, the worker may check work area P set by the administrator, the work information O for the work area, distance F from the current location confirmed through the GPS to the work area, etc. from the worker screen.

The worker may approve the work request signal through the worker terminal 400 when the worker is in a workable state. In this case, the worker terminal 400 may transmit an approval signal through the server 100 to the administrator terminal 300 that have sent the work request signal.

The worker terminal 400 may call another worker or equipment to the work area P set by the administrator, a specific area, and the location of the worker terminal 400. However, a function may be restricted according to the authority set for the worker when the worker terminal 400 is used for the calling, compared with the case of calling the worker or the equipment using the administrator terminal 300. The set authority may be determined from the list of workers stored in the database 200.

The worker terminal 400 may load a worker call window W4 on one side of the worker screen for worker call. The worker call window W4 may include a worker type selection window W5 for selecting a call type. The worker call window W4 may display the list of workers according to a type selected in the worker type selection window W5. A worker list W6 may display the list of a plurality of workers including called the worker type, the worker information, and the distance from the call point of the worker.

For example, when the worker terminal 400 displays the worker type selection window W5 in the worker call window W4, the worker type may be displayed together with the classified construction equipment type provided by the database 200. The classified construction equipment may include civil engineering foundation equipment, production equipment, packaging equipment, transport and unload equipment, support equipment, and special construction machinery. The worker terminal 400 may classify and display the construction equipment by use (civil foundation, production equipment, packaging equipment, transport and unloading, support, special construction), so that the worker may make a search for the construction equipment more intuitively.

The worker terminal 400 may display a detailed classified list, when the construction equipment is selected from a list of the construction equipment classified by use. For example, the civil foundation equipment may be subdivided into earthmoving equipment, foundation equipment, and stationary equipment. The production equipment may be subdivided into aggregate equipment and plant equipment. The paver equipment may be subdivided into concrete equipment and asphalt equipment. The transport and unloading equipment may be subdivided into transport equipment and unloading equipment.

The worker terminal 400 may display the detailed information in the worker list W6 when the worker requests the detailed information about other worker. For example, the worker list W6 may display the weight, radius, quantity, year, or loading amount of construction equipment owned by other worker. In addition, the worker list W6 may display other worker's history, age, qualification, and the like as a list.

The worker terminal 400 may transmit the follow-up work request signal to the specific other worker selected by the worker in the worker type selection window W5 and the worker list W6. The follow-up work request signal may include the designated work area P and the work information O. The follow-up work request signal may include the contents of the work request signal received from the administrator terminal 300. The selected specific other worker may select one of response R and rejection NR through the worker terminal 400. The worker terminal 400 for transmitting the follow-up work request signal may be defined as a first worker terminal. The worker terminal 400 for receiving the follow-up work request signal may be defined as a second worker terminal.

When the worker does not select the specific other worker, the follow-up work request signal may be transmitted to the target worker terminals 400 of a plurality of the workers. The follow-up work request signal may include the designated work area P and the work information O. For example, the follow-up work request signal may be transmitted t to a classified group selected in the worker type selection window W5. The selected classified group may include civil foundation equipment holding worker group, production equipment holding worker group, packaging equipment holding worker group, transport and unloading equipment holding worker group, support equipment holding worker group, and special construction machine holding worker group. Alternatively, the follow-up work request signal may be transmitted to all worker terminals 400 at the construction site.

When the worker does not specify other worker, a plurality of random workers required for the number of workers may respond to the follow-up work request signal. When the number of workers is satisfied, the transmission of the follow-up work request signal to the non-responsive worker terminal 400 may be stopped.

Hereinafter, a method of call sharing for the construction work using the call sharing system for the construction work in FIG. 1 will be explained.

Figure 8:
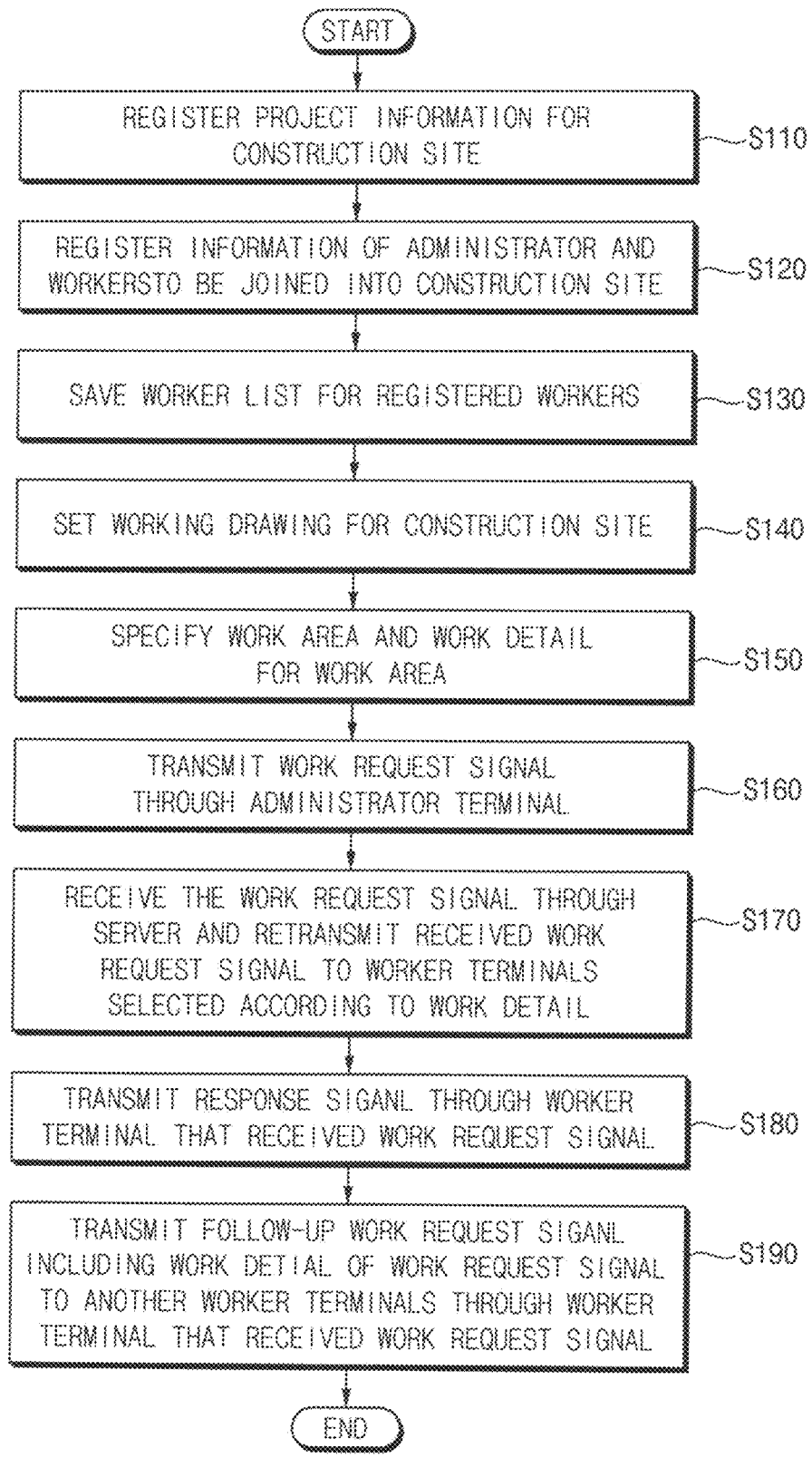
FIG. 8 is a flow chart illustrating a method of call sharing for a construction work.

FIG. 8 is a flow chart illustrating a method of call sharing for a construction work.

Referring to FIGS. 1 to 8, first, project information for a construction work may be registered (S110).

In example embodiments, the project information may include all information necessary for construction work. For example, the project information may include schedule information of construction work configuration tasks, relationship information between each task, and information on the quantity of resources planned for performing the construction work. The project information may be registered through a server 100 and stored in the database 200.

Then, information of an administrator and workers to be joined into the construction site may be registered (S120), a list of workers for registered workers may be stored (S130). The worker information collected from workers at the construction site by an administrator may be inputted to the server 100 through an input device. The worker information may include the list of workers classified by groups.

In example embodiments, the server 100 may manage by giving identification information to the administrator and the workers joined for the project. The administrator and the workers may log in to the manager application and the worker application through the identification information, respectively In example embodiments, the list of workers may include worker identification information, worker authority information, construction machine information, vehicle number, affiliated company information, worker identification information, current location information, idle identification information, and the like. In addition, the list of workers may classify and store worker identification information provided to the worker joined for the project, worker authority information, owned construction machine information, affiliated company information, qualification information, etc. The list of workers may be stored in the database 200 through the server 100.

Then, a working drawing for the construction site may be set (S140).

In example embodiments, the working drawing may be overlaid with a field map. The field map may be a map photographed in the air through a drone. The working drawing may be set in the administrator terminal 300.

Then, a work area and a work detail for the work area may be designated (S150).

In example embodiments, the work area may be designated on the working drawing through the administrator terminal 300. For example, the work area may be set by using a method of freely designating an area on a screen on which the working drawing and the field map are overlaid. In addition, the work detail may be input for the designated work area through administrator terminal 300. The work detail may include planting work, transport work, excavation work, civil works, and the like.

Then, a work request signal may be transmitted through the administrator terminal (S160).

In example embodiments, the work request signal may include the work area designated on the working drawing. For example, the administrator terminal 300 may transmit a work request signal to a specific worker terminal 400. Alternatively, when the specific worker terminal 400 is not selected in the administrator terminal 300, the administrator terminal 300 may transmit the work request signal to a plurality of target worker terminals 400.

Then, the work request signal may be received and the received work request signal may be retransmitted to a plurality of the worker terminals selected according to the work detail through the server 100 (S180).

In example embodiments, the server 100 may select the worker terminal 400 suitable for the work detail in the database 200 in consideration of the stored worker identification information, worker authority information, construction machine information, vehicle number, affiliated company information, worker identification information, current location information, idle identification information, etc.

The server 100 may retransmit the work request signal received from the administrator terminal 300 to the selected worker terminal 400.

Subsequently, a response signal may be transmitted to the administrator terminal 300 through the worker terminal receiving the work request signal (S180).

In example embodiments, in a situation in which the work request signal is transmitted to the specific worker terminal 400, the transmission of the work request signal may be stopped, when the worker responds to or rejects the work request signal. Alternatively, in a situation in which the work request signal is transmitted to a plurality of the worker terminals 400, the transmission of the work request signal to the other worker terminal 400 that has not responded may be stopped, when the number of workers set by the administrator is satisfied.

Then, the worker terminal 400 receiving the work request signal may transmit a follow-up work request signal including contents of the work request signal to the other worker terminal (S190).

In example embodiments, the follow-up work request signal may include contents of the work request signal input by the administrator. The worker may transmit a request for a follow-up work with respect to the received work request signal to a second worker terminal 400 through a first worker terminal 400.

Figure 9:
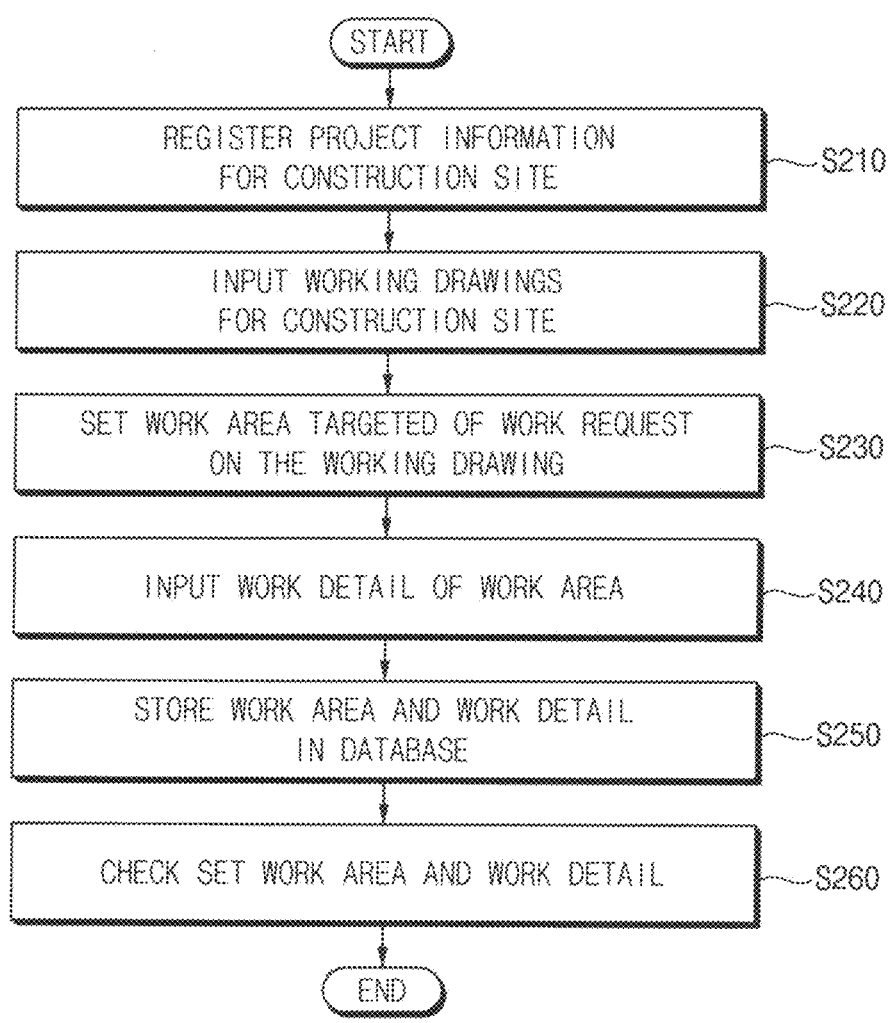
FIG. 9 is a flow chart illustrating a data input process.

FIG. 9 is a flow chart illustrating a data input process.

Referring to FIGS. 1 and 9, first, the project information for the construction site may be registered (S210).

In example embodiments, the project information may include all information necessary for construction work. For example, the project information may include schedule information of construction work configuration tasks, relationship information between each task, and information on the quantity of resources planned for performing the construction work.

Then, the working drawing for the construction site may be input (S220).

In example embodiments, the set working drawing may be overlaid with the field map. The field map may be a map photographed in the air through a drone.

Then, the work area that corresponds to the target of the work request may be set on the working drawing (S230).

In example embodiments, the administrator terminal 300 may set the work area on the working drawing and the field map. For example, the work area may be set by freely designating an area on a screen on which the work drawing and the field map are overlaid.

Then, the work detail for the work area may be input (S240).

The administrator terminal 300 may additionally input the work detail on the work area. For example the work detail may include planting work, transport work, excavation work, civil works, and the like.

Then, the work area and the work detail may be stored in the database (S250).

In example embodiments, in example embodiments, the designated work area may be transferred and stored in the database 200 through the server 100, and the designated work area stored in the database 200 may be reloaded as needed.

Then, the designated work area and the work detail may be checked (S260).

In example embodiments, the work area and the work detail may be displayed on the screen of the administrator terminal 300 or the worker terminal 400.

As mentioned above, the administrator and the workers in the construction site may share a location of workers based on their terminals, and it may be possible to manage the construction work in real time through the system that may share the work area specified on the working drawings for the construction site. Furthermore, it is possible to increase productivity for the construction work through a map area-based call system between the workers.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages of the present disclosure. Accordingly, all such modifications are intended to be included within the scope of example embodiments as defined in the claims.

What is claimed is:

1. A call sharing system for construction work, the call sharing system comprising:
    an administrator terminal configured to display a working drawing of a construction site on an administrator screen and to transmit a work request signal including a work area designated on the working drawing;
    a plurality of worker terminals configured to display the working drawing on each worker screen, each worker terminal being configured to receive the work request signal and to transmit a response signal in response to receiving the work request signal; and
    a server configured to transmit and receive data between the administrator terminal and the worker terminals and to select a subset of worker terminals of the plurality of worker terminals for receiving the work request signal according to a work detail set by the administrator terminal in the work request signal,
    wherein a first worker terminal of the plurality of worker terminal transmits a follow-up work request signal including a work request for follow-up work to be performed subsequently after a current work, and
    a second worker terminal of the plurality of worker terminals receives the follow-up work request signal and transmits the response signal in response to the follow-up work request signal.

2. The call sharing system of claim 1, wherein the administrator terminal stops transmitting the work request signal when the administrator terminal receives the response signal from a preset number of worker terminals of the plurality of worker terminals.

3. The call sharing system of claim 1, wherein the server further includes a list of workers that classifies registered workers according to worker information, and the administrator terminal selectively transmits the work request signal according to the worker information.

4. The call sharing system of claim 3, wherein the administrator terminal selectively transmits the work request signal according to construction machinery associated with the workers.

5. The call sharing system of claim 1, wherein the server further include a field map, and
    the administrator terminal overlays the working drawing and the field map, and displays the overlaid working drawing and field map on the administrator screen.

6. The call sharing system of claim 1, wherein the administrator terminal displays worker information, a current location and a distance from the designated work area of the worker terminal on the administrator screen.

7. The call sharing system of claim 1, wherein each worker terminal of the plurality of worker terminals displays worker information, a current location and a distance from the designated work area of other worker terminals of the plurality of worker terminals on the worker screen.

8. A method of call sharing for a construction work, the method comprising:

transmitting a work request signal including a work area designated on a working drawing of a construction site to a server through an administrator terminal;
selecting, by the server, based on a work detail set by the administrator terminal in the work request, a subset of worker terminals out of a plurality of worker terminals associated with the administrator terminal,;
transmitting the work request signal received through the server to a subset of worker terminals selected from the plurality of worker terminals according to the work detail; and
transmitting a response signal in response to the work request signal to the administrator terminal through worker terminals that received the work request signal,
wherein the method further comprises:
transmitting a follow-up work request signal including a work request for follow-up work to be performed subsequently after a current work to a second worker terminal of the plurality of worker terminals through a first worker terminal of the plurality of worker terminals that received the work request signal; and
transmitting the response signal in response to the follow-up work request signal to the administrator terminal and the first worker terminal through the second worker terminal.

9. The method of claim 8, wherein the administrator terminal stops transmitting the work request signal when the administrator terminal receives the response signal from a preset number of worker terminals of the plurality of worker terminals.

10. The method of claim 8, further comprising:
registering a group of workers including information about the workers on the construction site.

11. The method of claim 10, wherein transmitting the work request signal to the subset of worker terminals includes selectively transmitting the work request signal according to construction machinery associated with the registered group of workers.

12. The method of claim 10, further comprising:
displaying worker information, a current location and a distance from the designated work area of the worker terminals on an administrator screen of the administrator terminal.

13. The method of claim 10, further comprising:
displaying worker information, a current location and a distance from the designated work area of the other worker terminal on a worker screen of the worker terminal.

* * * * *